(12) United States Patent
Sadowski

(10) Patent No.: US 6,819,333 B1
(45) Date of Patent: Nov. 16, 2004

(54) SYSTEM AND METHOD FOR DISPLAYING AN IMAGE USING DISPLAY DISTORTION CORRECTION

(75) Inventor: Greg Sadowski, Santa Clara, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/569,655

(22) Filed: May 12, 2000

(51) Int. Cl.[7] .............................................. G06F 15/66
(52) U.S. Cl. ....................... 345/647; 345/606; 345/611; 345/612; 345/613; 345/619
(58) Field of Search ................................ 345/581, 589, 345/606, 611, 612, 613, 649, 619

(56) References Cited

U.S. PATENT DOCUMENTS

| | | | |
|---|---|---|---|
| 4,772,942 A | | 9/1988 | Tuck ........................... 358/87 |
| 4,862,388 A | * | 8/1989 | Bunker ........................ 345/427 |
| 4,864,393 A | * | 9/1989 | Harradine et al. .......... 348/699 |
| 5,003,615 A | * | 3/1991 | Seitz ........................... 382/22 |
| 5,065,238 A | | 11/1991 | Vagi et al. .................. 358/111 |
| 5,077,501 A | | 12/1991 | Hartmann et al. .......... 315/371 |
| 5,175,808 A | * | 12/1992 | Sayre .......................... 345/647 |
| 5,319,744 A | * | 6/1994 | Kelly et al. ................. 345/427 |
| 5,329,310 A | | 7/1994 | Liljegren et al. ........... 348/147 |
| 5,355,188 A | | 10/1994 | Biles et al. .................. 353/69 |
| 5,414,521 A | | 5/1995 | Ansley ........................ 348/123 |
| 5,434,595 A | | 7/1995 | Macaulay .................... 345/207 |
| 5,703,605 A | | 12/1997 | Takahashi et al. ............ 345/8 |
| 5,748,264 A | * | 5/1998 | Hegg ............................. 345/8 |
| 5,762,413 A | | 6/1998 | Colucci et al. ............. 353/122 |
| 5,784,114 A | * | 7/1998 | Borer et al. ................ 348/452 |
| 5,841,413 A | | 11/1998 | Zhu et al. ..................... 345/63 |
| 5,854,656 A | | 12/1998 | Noggle ........................ 348/311 |
| 5,864,431 A | | 1/1999 | Bordovsky ................... 359/630 |
| 5,889,625 A | | 3/1999 | Chen et al. .................. 359/637 |

(List continued on next page.)

FOREIGN PATENT DOCUMENTS

| EP | 867 760 A1 | 9/1998 |
|---|---|---|
| WO | 9802863 | 7/1998 |

OTHER PUBLICATIONS

"Features of Oceania," Internet; www.angel.com/products/oceania_features.html; all.

"8/70 Dome Geometry;" Internet; www.megasystem.com/dome.html; all.

J. Goel, et al.; "Correcting Distortions in Digital Displays and Projectors Using Real–Time Digital Image Warping;" all.

"Display Distortions Correction Solutions".

Primary Examiner—Matthew Luu
Assistant Examiner—Daniel T Chung
(74) Attorney, Agent, or Firm—Baker Botts L.L.P.

(57) ABSTRACT

A system (10) for display distortion correction includes a database (18) that stores one or more pixel correction vectors (40) and one or more sub-pixel correction vectors (42). The system (10) also includes a buffer (14) that receives and stores an input image data unit (32) including a plurality of pixels. Furthermore, the system includes a system controller (12) that is coupled to the database and to the buffer. The system controller (12) generates a coarsely-corrected image data unit by mapping one or more pixels of the coarsely-corrected image data unit to corresponding pixels of the input image data unit (32) according to corresponding pixel correction vectors (40). Each pixel correction vector (40) is associated with a particular pixel of the coarsely-corrected image data unit. The system also includes an interpolation filter (16) that is coupled to the system controller (12) and the database (18). The interpolation filter (16) receives the coarsely-corrected image data unit and generates a finely-corrected image data unit (30) using the coarsely-corrected image data unit and corresponding sub-pixel correction vectors (42).

28 Claims, 3 Drawing Sheets

U.S. PATENT DOCUMENTS

| | | | | |
|---|---|---|---|---|
| 5,903,273 A | * | 5/1999 | Mochizuki et al. | 345/423 |
| 5,909,317 A | | 6/1999 | Nakaoka et al. | 359/631 |
| 6,165,658 A | * | 12/2000 | Taff et al. | 430/30 |
| 6,281,931 B1 | * | 8/2001 | Tsao et al. | 348/247 |
| 6,297,814 B1 | * | 10/2001 | Masuda et al. | 345/204 |
| 6,369,814 B1 | * | 4/2002 | Dorbie | 345/419 |
| 6,430,316 B1 | * | 8/2002 | Wilkinson | 382/236 |
| 6,456,340 B1 | * | 9/2002 | Margulis | 348/745 |
| 6,597,818 B2 | * | 7/2003 | Kumar et al. | 382/294 |
| 2001/0030697 A1 | * | 10/2001 | Dischert et al. | 348/263 |

* cited by examiner

SYSTEM AND METHOD FOR DISPLAYING AN IMAGE USING DISPLAY DISTORTION CORRECTION

TECHNICAL FIELD OF THE INVENTION

This invention relates generally to the field of image displays, and more particularly to a system and method for displaying an image using display distortion correction.

BACKGROUND OF THE INVENTION

Although video and other image display surfaces, such as projection screens, are often substantially flat, certain applications call for non-flat display surfaces. One example is a concave display surface, such as might be associated with a computer monitor or a domed theatre. Since video and other image display equipment typically generates an image signal assuming a substantially flat display surface, distortion is created if such an image is displayed on a curved, irregular, or other non-flat surface. Therefore, there is a need to correct for this distortion when an image is to be displayed on a non-flat display surface. Previous methods of correcting for display distortion have included optical devices (such as lenses), texture mapping hardware, and polynomial warping hardware. These techniques are often relatively expensive and are typically limited to a limited number of pre-defined display surfaces. The texture mapping and polynomial warping hardware in particular require significant computer resources and may decrease the ability of the image display equipment to generate the image efficiently.

SUMMARY OF THE INVENTION

According to the present invention, disadvantages and problems associated with previous systems and methods for displaying images have been substantially reduced or eliminated.

A system for display distortion correction includes a database that stores one or more pixel correction vectors and one or more sub-pixel correction vectors. The system also includes a buffer that receives and stores an input image data unit including a plurality of pixels. Furthermore, the system includes a system controller that is coupled to the database and to the buffer. The system controller generates a coarsely-corrected image data unit including a plurality of pixels by mapping one or more pixels of the coarsely-corrected image data unit to corresponding pixels of the input image data unit according to corresponding pixel correction vectors. Each pixel correction vector is associated with a particular pixel of the coarsely-corrected image data unit. The system also includes an interpolation filter that is coupled to the system controller and the database. The interpolation filter receives the coarsely-corrected image data unit and generates a finely-corrected image data unit using the coarsely-corrected image data unit and corresponding sub-pixel correction vectors.

The system and method of the present invention provide a number of important technical advantages. The present invention is less expensive more computationally efficient, and more versatile than existing techniques for display distortion correction. The present invention accomplishes display distortion correction using correction vectors that have been previously calculated to map pixels of an uncorrected video or other suitable input image to pixels of a corrected video or other output image. The correction vectors may be determined for virtually any specified display surface using conventional techniques. Because only one set of correction vectors is required for each specified display surface, these vectors can be calculated once and the results stored for multiple subsequent uses according to the present invention. Existing display distortion correction techniques require a non-flat surface to flat surface mapping to be performed for every video frame or other unit of image data, which often requires substantial computer resources. In addition, the performance of these systems varies based on the type of display surface to be used (processing more complicated and irregular display surfaces typically takes longer). Other existing systems using relatively expensive optical equipment, such as optical lenses, are typically limited to a relatively small number of pre-defined display surfaces. The present invention, in contrast, provides a relatively inexpensive, efficient, and universal method of correcting display distortion. Other important technical advantages are readily apparent to those skilled in the art.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
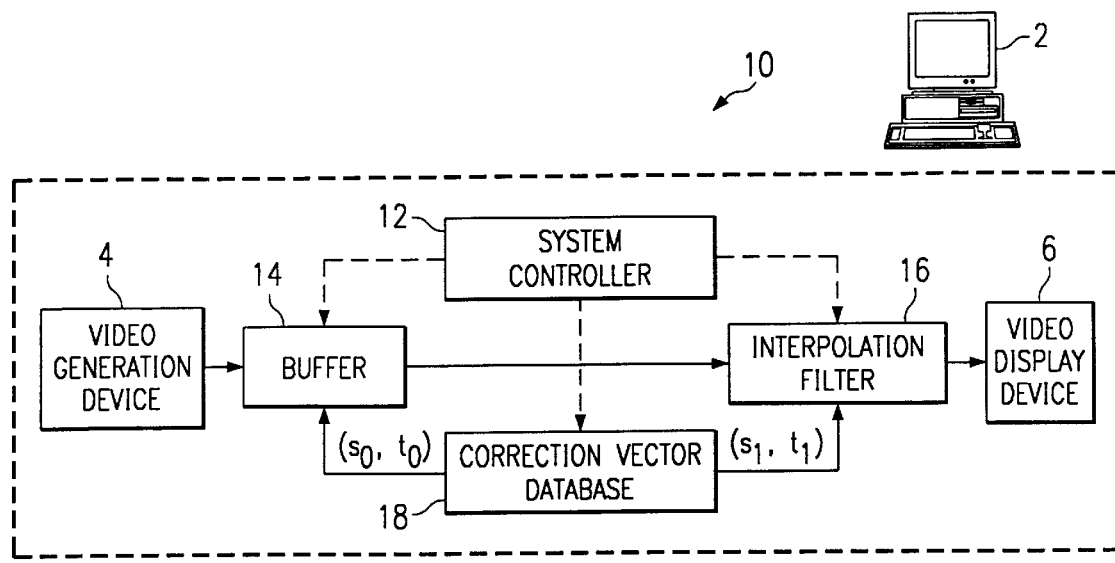
FIG. 1 illustrates an exemplary system for displaying an image using display distortion correction.

FIG. 1 illustrates an exemplary system 10 for displaying an image using display distortion correction. System 10 includes a system controller 12 that controls the operation of an image data buffer 14, an interpolation filter 16, and a correction vector database 18, which may be integral to or separate from one another. These components of system 10 may be implemented as hardware, software, or firmware operating on one or more computers 2 at one or more locations. For example only, and not by way of limitation, computer 2 may be a computer workstation having a graphics or other media card into which one or more of system controller 12, buffer 14, interpolation filter 16, and correction vector database 18 are incorporated. System 10 also includes a digital or other suitable video generation device 4 that generates an image or series of images (which have not been corrected for a non-flat display) and communicates the images to buffer 14. System 10 further includes a digital or other appropriate video display device 6, such as a computer monitor or a projector, that displays a distortion corrected image or images received from interpolation filter 16. The term "display" should be understood to include image display using a cathode ray tube (CRT), liquid crystal display (LCD), light projection, light-emitting diode, gas plasma, or other image display technology. Video generation device 4 and video display device 6 may be integral components of computer 2, peripheral to computer 2, or separate from computer 2.

Buffer 14 receives and stores one or more frames, fields, or other units of a digital video or other image data input received from video generation device 4 or any other appropriate source. The phrase "image data" is meant to include a frame, field, or any other unit of data including an image or series of images. Furthermore, although display distortion correction for video image data is primarily described, the present invention encompasses all appropriate forms of digital visual data, including a single image or a series of images. Each image data unit includes at least a portion of a single image in the video input. The image is formed by numerous pixels that each have one or more assigned values that indicate how a video display device is to display the image. In a color image, for example, each pixel may include a red element, a green element, and a blue element, with each element having its own value. The values of each pixel indicate the relative intensities, amplitudes, or other appropriate parameters of the pixels so that an image may be displayed for viewing. Although each pixel is primarily described as having a single value that represents a suitable generic parameter associated with the pixel, the present invention is similarly applicable to pixels with any number of parameters and associated values.

Typical video generation devices 4 produce image data units that are suitable for display on a substantially flat surface. For example, a video generation device 4 associated with a portable video projection device may communicate a digital video input to the video projection device for projection onto a substantially flat projection screen for display as a substantially flat image. The video input might instead be sent to a computer monitor having a substantially flat surface for display as a substantially flat image. However, it may be desirable to display or project image data onto a non-flat surface, for example, a domed or concave surface. It may also be desirable to project image data onto an irregularly shaped surface, such as a rough rock wall or the side of a building having windows and balconies. However, if image data that has been generated for display on a substantially flat surface is instead displayed on a non-flat surface, the image or images displayed will appear distorted absent appropriate distortion correction.

The present invention reduces or eliminates this problem by manipulating image data that has been generated for display on a substantially flat surface so that it may be displayed with little or no distortion on a non-flat surface. An input image data unit that has been formatted for flat-screen display is received and stored in buffer 14 and, before, at substantially the same time as, or after the image data is received, system controller 12 obtains one or more correction vectors previously stored in correction vector database 18. Correction vector database 18 may include any type of component suitable for storing coordinates that define the correction vectors. For example, correction vector database 18 may include fixed or removable storage media, such as magnetic computer disks, CD-ROM, or other suitable media to store the correction vector coordinates. Correction vector database 18 may also include volatile or nonvolatile memory, such as RAM or ROM. System controller 12 uses the correction vectors to map each pixel of an output image data unit that is corrected for a non-flat display surface to a location in the input image data unit. The correction vectors identify the displacement of each pixel of the flat-screen input image data unit required to correct the display of the image for a non-flat display surface. In one embodiment, a set of correction vectors may be generated for each type of display surface and for each pixel resolution for which display distortion correction is desired. The correction vectors are generated according to conventional techniques for determining display distortion correction known to those skilled in the art.

In one embodiment, correction vector database 18 contains pixel correction vectors and sub-pixel correction vectors. The pixel correction vectors and sub-pixel correction vectors may be identified using an "s-t" coordinate system, where "s" is the horizontal axis in a rectangular input image data unit and "t" is the vertical axis in the image data unit. The pixel correction vectors are denoted by the coordinates $(s_0, t_0)$, where $s_0$ is equal to the horizontal displacement in pixels of the desired output pixel from an input pixel, and $t_0$ is equal to the vertical displacement in pixels of the desired output pixel from the input pixel. Using the pixel correction vectors, system controller 12 modifies each input image data unit stored in buffer 14 to generate a coarsely-corrected image data unit. A pixel correction vector that identifies a corresponding pixel of the input image data unit is associated with each pixel of the coarsely-corrected image data unit. System controller 12 assigns, to each pixel of the coarsely-corrected image data unit, the value of a pixel of the input image data unit that the associated pixel correction vector identifies, as described in further detail below. To associate the pixel correction vectors with pixels of the coarsely-corrected image data unit, the coordinates of the pixel correction vectors may be stored in database 18 in an array that corresponds to the location of the pixels of the coarsely-corrected image data unit. For example, and not by way of limitation, if the coarsely-corrected image data unit is a rectangular image data unit including 800×600 pixels, the coordinates of 48,000 separate pixel correction vectors may be stored in an 800×600 array.

The coarsely-corrected image data unit generated using the pixel correction vectors is "coarsely" corrected since a pixel of an output image data unit that is tailored for a specific type of non-flat display surface may not correspond exactly with a pixel of the input image data unit. Instead, the pixel of the output image data unit may correspond more closely with a "sub-pixel" in the input image data unit, which in one embodiment is an imaginary pixel located between pixels of the input image data unit. The term "imaginary" is used since the "sub-pixel" does not have a defined intensity, amplitude, or other value. A sub-pixel correction vector identifies the location of a sub-pixel that corresponds with a pixel of the output image data unit. The sub-pixel correction vector identifies the location of the sub-pixel relative to the location of the pixel of the video input image that was identified by an associated pixel correction vector. In one embodiment, the associated pixel correction vector identifies the pixel of the video input image that is closest to the location of the sub-pixel. The sub-pixel correction vectors may be denoted by the coordinates $(s_1, t_1)$, where $s_1$ is equal to the horizontal displacement of the desired video input sub-pixel from a video input pixel, and $t_1$ is equal to the vertical displacement of the desired video input sub-pixel from a video input pixel.

Figure 2:
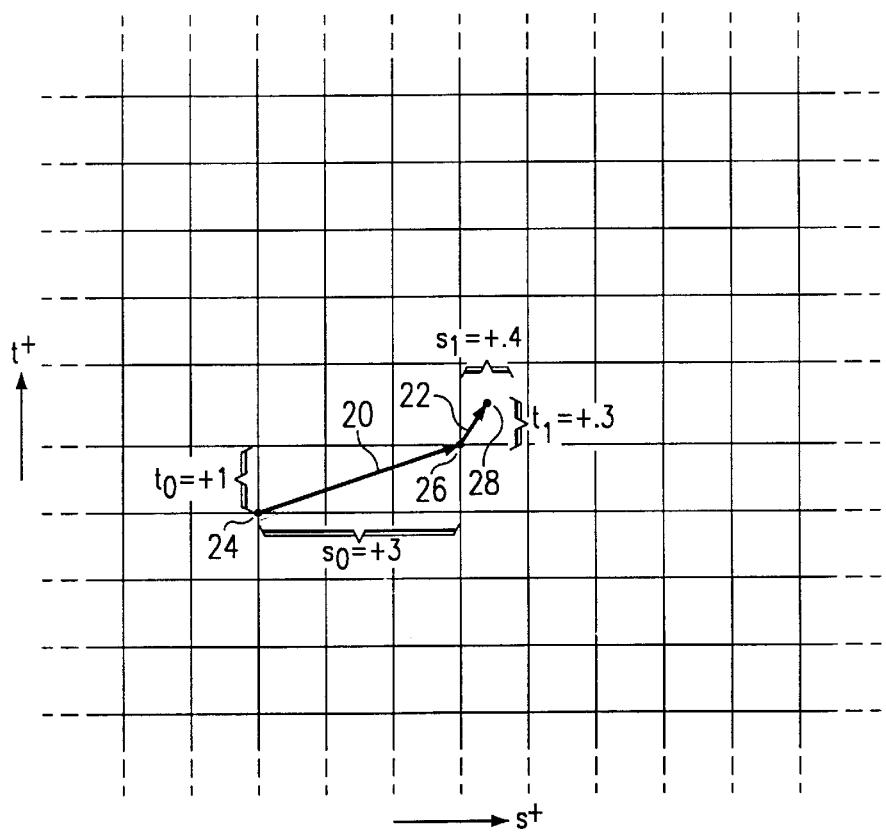
FIG. 2 illustrates an exemplary pixel correction vector and an exemplary sub-pixel correction vector.

FIG. 2 illustrates an exemplary pixel correction vector 20 and sub-pixel correction vector 22 on a grid in which each intersection of horizontal and vertical lines represents the location of a pixel. The value of an output pixel 24 in an output image data unit corrected for display distortion is referenced to the value of an input pixel 26 in an input image data unit using pixel correction vector 20. For example, and not by way of limitation, pixel correction vector 20 may be represented in database 18 using the coordinates (+3, +1), where "+3" is the displacement in the horizontal ("s") direction and "+1" is the displacement in the vertical ("t") direction. In the exemplary embodiment, a positive horizontal displacement is to the right and a positive vertical displacement is upwards, although any appropriate notation may be used. Using pixel correction vector 20, system controller 12 determines that the value of output pixel 24 in a coarsely-corrected image data unit should be the same as the value of input pixel 26 in the uncorrected input image data unit. However, as described above, the value of output pixel 24 in a finely-corrected output image data unit (an output image data unit having pixels mapped to sub-pixels of the input image data unit, if appropriate) may not map exactly to the value of pixel 26 in the input image data unit. Therefore, sub-pixel correction vector 22 is used to indicate a more precise location from which a value for output pixel 24 is to be obtained. In the particular example illustrated in FIG. 2, output pixel 24 maps to a value of a sub-pixel 28 located 0.4 pixels to the right and 0.3 pixels up from input pixel 26. Sub-pixel correction vector 22 is therefore denoted using the coordinates (+0.4, +0.3), which indicate the position of sub-pixel 28 relative to input pixel 26. However, since a pixel having a defined value does not actually exist in the input image data unit at the position of sub-pixel 28, interpolation or some other appropriate method is used to obtain the value of sub-pixel 28 to be assigned to output pixel 24, as described below.

Figure 3:
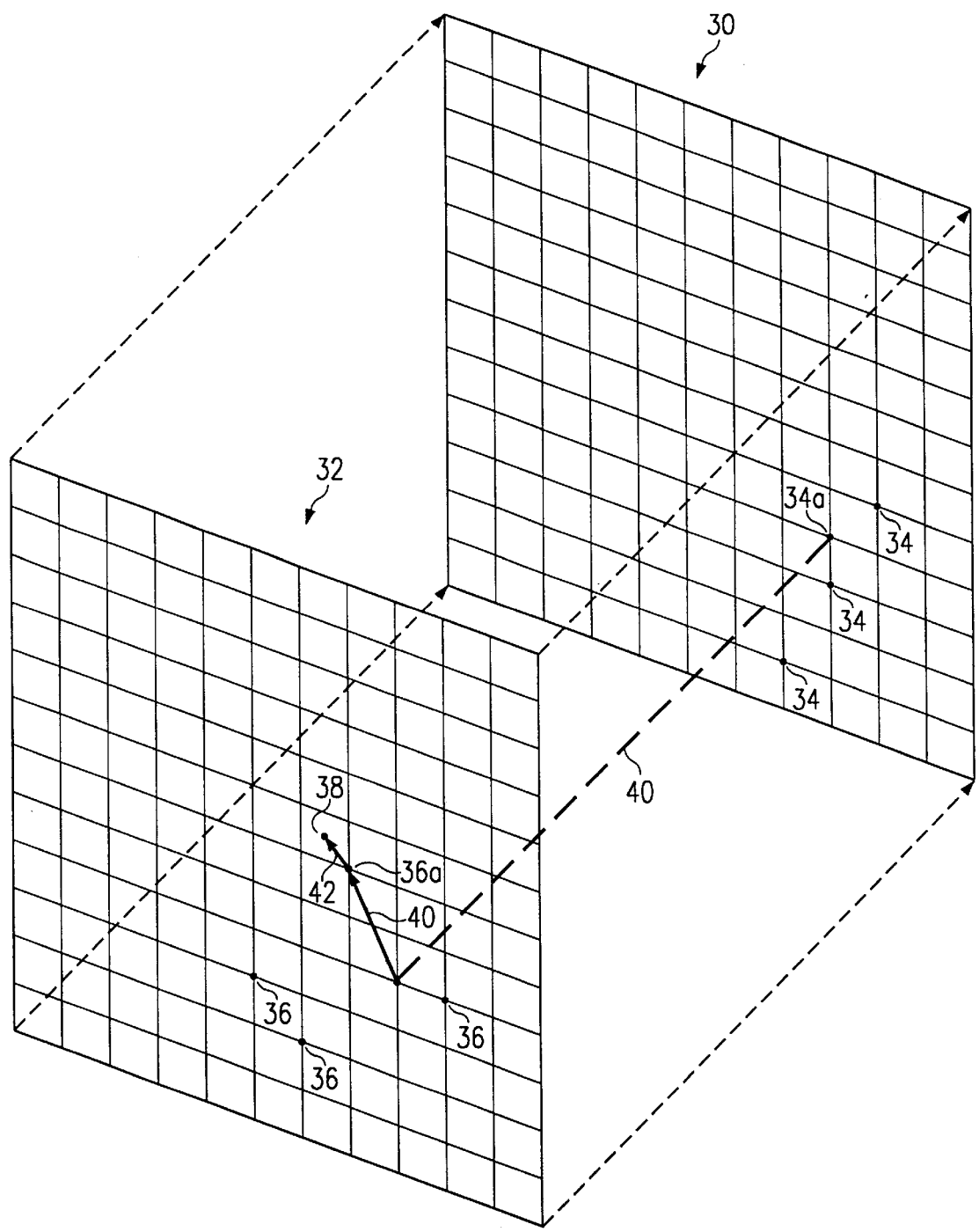
FIG. 3 illustrates exemplary mapping of finely corrected output image data to uncorrected input image data.

FIG. 3 illustrates exemplary mapping of a finely-corrected output image data unit 30 to an uncorrected input image data unit 32. As described above, system 10 maps each pixel 34 of output image data unit 30 to a pixel 36 or a sub-pixel 38 of input image data unit 32. This mapping is performed using a pixel correction vector 40 and sub-pixel correction vector 42 that indicate the value of each output pixel 34 as referenced to an input pixel 36 or sub-pixel 38, respectively. For example, an output pixel 34a may be identified as having the same value as a sub-pixel 38 which has a location relative to output pixel 34a as indicated by the sum of correction vectors 40 and 42. Pixel correction vector 40 may indicate the location of a pixel 36a of input image data unit 32 proximate to sub-pixel 38, and sub-pixel correction vector 42 may indicate the location of sub-pixel 38 with respect to pixel 36a. System 10 determines the value of sub-pixel 38 and assigns the value to output pixel 34a. This procedure is preferably performed for each pixel of output image data unit 30, although such processing may be limited to one or more selected pixels without departing from the intended scope of the present invention.

Referring again to FIG. 1, interpolation filter 16 is used to determine the value of a sub-pixel 38 of an input image data unit 32. As described above, the value of a sub-pixel 38 of input image data unit 32 is not typically defined. Therefore, the values of one or more surrounding pixels 36 may be used to determine the value of a sub-pixel 38. After system controller 12 maps each pixel 34 of output image data unit 30 to a pixel of the input image data unit 32 to create a coarsely-corrected image data unit (which may be an actual image or simply a map indicating the location of the pixel 36 of the input image data unit 32 associated with each pixel of the coarsely-corrected image data unit), the coarsely-corrected image data unit is then communicated to interpolation filter 16. Interpolation filter 16 generates a finely-corrected output image data unit 30 using the sub-pixel correction vectors 42 and relevant pixel values from the input image data unit 32 to determine the values of each pixel 34 of the finely-corrected output image data unit 30.

Interpolation filter 16 may use linear interpolation to determine the value of a sub-pixel 38 of the input image data unit 32 to be assigned to a pixel 34 of the finely-corrected output image data unit 30. In this method, the value of the four pixels 36 surrounding the sub-pixel 38 may be weighted based on the distance between the sub-pixel and each of the surrounding pixels 36. An average is then taken of the weighted values to determine a value for the sub-pixel 38. For example, if the sub-pixel 38 was located equidistant from each of the four surrounding pixels 36, the value of the sub-pixel might be determined by taking the average of the values of each of the surrounding pixels 36. Since each of the surrounding pixels 36 is equidistant from the sub-pixel 38, each of their values is given the same weight. Alternatively, if a sub-pixel 38 is twice as close to one surrounding pixel 36 as it is to the remaining three surrounding pixels 36, the value of the sub-pixel 38 might be determined by adding twice the value of the closest surrounding pixel 36 to the values of the remaining three surrounding pixels 36 and dividing by four. A similar interpolation may be performed for any other sub-pixel position.

Interpolation filter 16 may alternatively incorporate a convolution filter that uses the values of numerous other surrounding pixels 36 to determine the value of a sub-pixel 38. For example, the sixty-four surrounding pixels 36 (or any other appropriate number of surrounding pixels 36) might be used instead of the four surrounding pixels 36 described above. Interpolation filter 16 may also use cubic interpolation to determine the value of a sub-pixel 38, or interpolation filter 16 may simply assign the sub-pixel 38 the value of the closest pixel 36 to which the sub-pixel 38 is located. In addition, if the input image is in color, the interpolation or other method for determining a sub-pixel value may be performed for the red, green, and blue values associated with each pixel. Any other appropriate method of determining the value of a sub-pixel 38 is also included within the scope of the present invention.

Figure 4:
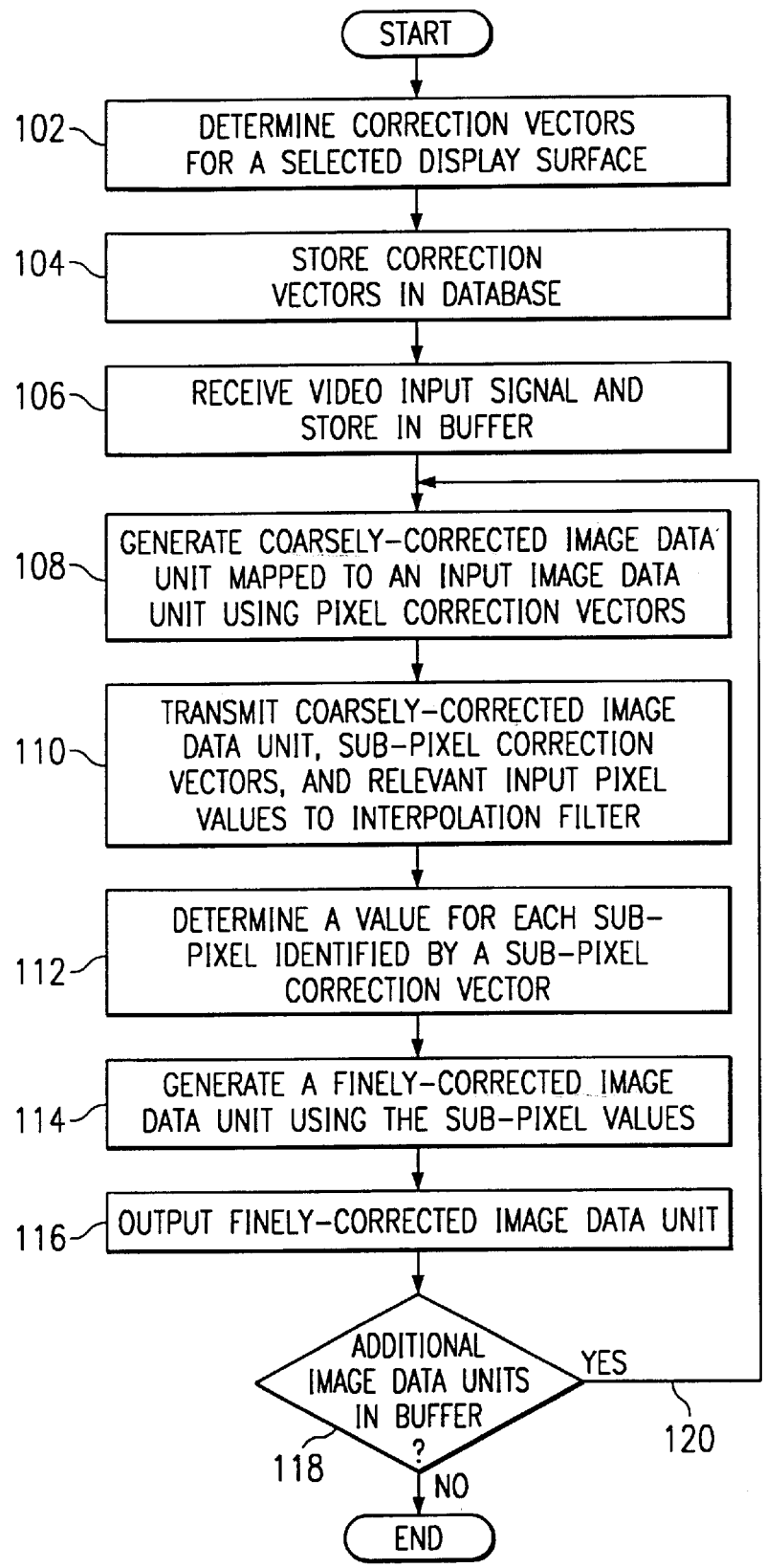
FIG. 4 illustrates an exemplary method of displaying an image using display distortion correction.

FIG. 4 illustrates an exemplary method of displaying an image using display distortion correction. The method begins at step 102, where an appropriate set of pixel correction vectors 40 and sub-pixel correction vectors 42 are determined for a specified display surface using known methods. The correction vectors 40 and 42 are stored in correction vector database 18 at step 104. A video or other input signal including one or more image data units that were generated for a substantially flat display surface is received and stored in buffer 14 at step 106. Each image data unit of the input signal may be stored separately in buffer 14. At step 108, system controller 12 obtains pixel correction vectors 40 from database 18 and generates a coarsely-corrected image data unit mapped to an input image data unit 32 using pixel correction vectors 40.

The coarsely-corrected image data unit, sub-pixel correction vectors 42 (from database 18), and any relevant pixel values from the input image data unit 32 are then communicated to interpolation filter 16 at step 110. At step 112, interpolation filter 16 determines the values of the sub-pixels 38 identified by sub-pixel correction vectors 42. Using these sub-pixel values, system controller 12 generates a finely-corrected output image data unit 30 at step 114 and outputs image data unit 30 at step 116. The finely-corrected output image data unit 30 may be output to a buffer, a video display device, or any other appropriate destination. If system controller 12 determines that additional input image data units 32 are stored in buffer 14 at step 118, the method returns to step 108 as indicated by arrow 120. Steps 108 to 116 may be repeated as many times as desired, for example, until no further input image data units 32 exist in buffer 14.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for display distortion correction, comprising:
   a database operable to store one or more pixel correction vectors and one or more sub-pixel correction vectors;
   a buffer operable to store an input image data unit comprising a plurality of pixels;
   a system controller coupled to the database and to the buffer, the system controller operable to generate a coarsely-corrected image data unit, the system controller operable to map one or more pixels of the coarsely-corrected image data unit to corresponding pixels of the input image data unit according to corresponding pixel correction vectors, each pixel correction vector associated with a particular pixel of the coarsely-corrected image data unit; and
   an interpolation filter coupled to the system controller and the database, the interpolation filter operable to receive the coarsely-corrected image data unit and to generate a finely-corrected image data unit using the coarsely-corrected image data unit and corresponding sub-pixel correction vectors.

2. The system of claim 1, further comprising a computer workstation.

3. The system of claim 1, further comprising a video generation device operable to generate the input image data unit and to communicate the input image data unit to the buffer.

4. The system of claim 1, further comprising a video display device operable to receive the finely-corrected image data unit and to display the finely-corrected image data unit on a substantially non-flat surface.

5. The system of claim 1, wherein the image data units comprise frames of video data.

6. The system of claim 1, wherein each pixel correction vector identifies the location of a pixel of the input image data unit relative to the location of the pixel of the coarsely-corrected image data unit with which the pixel correction vector is associated.

7. The system of claim 6, wherein each pixel correction vector is stored as a coordinate set indicating a vertical displacement in pixels and a horizontal displacement in pixels.

8. The system of claim 6, wherein the pixel correction vectors are stored in an array corresponding to an array of pixels of the coarsely-corrected image data unit.

9. The system of claim 1, wherein each sub-pixel correction vector is associated with a pixel of the coarsely-corrected image data unit and its corresponding pixel correction vector.

10. The system of claim 9, wherein each sub-pixel correction vector identifies the location of a sub-pixel of the input image data unit relative to the location of the pixel of the input image data unit identified by the associated pixel correction vector.

11. The system of claim 9, wherein the interpolation filter is further operable to assign a value of a sub-pixel of the input image data unit identified by a sub-pixel correction vector to the pixel of the coarsely-corrected image data unit associated with the sub-pixel correction vector.

12. The system of claim 11, wherein the interpolation filter is further operable to determine the value of the sub-pixel according to the values of one or more surrounding pixels of the input image data unit.

13. The system of claim 10, wherein each sub-pixel correction vector is stored as a coordinate set indicating a vertical displacement in pixels and a horizontal displacement in pixels.

14. The system of claim 9, wherein the sub-pixel correction vectors are stored in an array corresponding to an array of pixels of the coarsely-corrected image data unit.

15. The system of claim 1, wherein the pixel correction vectors and the sub-pixel correction vectors are associated with a specified non-flat display surface.

16. A method for display distortion correction, comprising:
   determining one or more pixel correction vectors and one or more sub-pixel correction vectors;
   receiving an input image data unit;
   mapping one or more pixels of a coarsely-corrected image data unit to corresponding pixels of the input image data unit according to corresponding pixel correction vectors, each pixel correction vector associated with a particular pixel of the coarsely-corrected image data unit; and
   generating a finely-corrected image data unit using the coarsely-corrected image data unit and the sub-pixel correction vectors.

17. The method of claim 16, further comprising storing the input image data units in a buffer as the image data units are received, the image data units comprising frames of video data.

18. The method of claim 16, wherein each pixel correction vector identifies the location of a pixel of the input image data unit relative to the location of a pixel of the coarsely-corrected image data unit with which the pixel correction vector is associated.

19. The method of claim 18, further comprising:
   storing each pixel correction vector as a coordinate set indicating a vertical displacement in pixels and a horizontal displacement in pixels.

20. The method of claim 18, further comprising storing the pixel correction vectors in an array corresponding to an array of pixels of the coarsely-corrected image data unit so that each pixel correction vector is associated with a pixel of the coarsely-corrected image data unit.

21. The method of claim 16, wherein each sub-pixel correction vector is associated with a pixel of the coarsely-corrected image data unit and its corresponding pixel correction vector.

22. The method of claim 21 claim 20, wherein each sub-pixel correction vector identifies the location of a sub-pixel of the input image data unit relative to the location of the pixel of the input image data unit identified by the associated pixel correction vector.

23. The method of claim 21, wherein generating a finely-corrected image data unit comprises assigning a value of a sub-pixel of the input image data unit identified by a sub-pixel correction vector to the pixel of the coarsely-corrected image data unit associated with the sub-pixel correction vector.

24. The method of claim 23, further comprising determining the value of a sub-pixel of the input image data unit according to the values of one or more surrounding pixels of the input image data unit.

25. The method of claim 22, further comprising storing each sub-pixel correction vector as a coordinate set indicating a vertical displacement in pixels and a horizontal displacement in pixels.

26. The method of claim 22, further comprising storing the sub-pixel correction vectors in an array corresponding to an array of pixels of the coarsely-corrected image data unit.

27. The method of claim 16, wherein the pixel correction vectors and the sub-pixel correction vectors are determined for a specified non-flat display surface.

28. The method of claim 27, further comprising communicating the finely-corrected image data unit to a video display device for display on the non-flat display surface for which the pixel correction vectors and sub-pixel correction vectors were determined.

* * * * *